United States Patent [19]

Lukacs, III

[11] Patent Number: 4,877,551

[45] Date of Patent: Oct. 31, 1989

[54] AQUEOUS SUSPENSION OF DELAMINATED VERMICULITE

[75] Inventor: Alexander Lukacs, III, Wilmington, Del.

[73] Assignee: Hercules Incorporated, Wilmington, Del.

[21] Appl. No.: 234,782

[22] Filed: Aug. 22, 1988

[51] Int. Cl.$^4$ .............................................. C04B 20/06
[52] U.S. Cl. ........................ 252/378 R; 106/DIG. 3; 428/363
[58] Field of Search ............. 252/378 R; 106/DIG. 3; 428/363

[56] References Cited

U.S. PATENT DOCUMENTS

| | | | |
|---|---|---|---|
| 2,531,396 | 11/1950 | Carter et al. | 260/41.5 |
| 2,531,427 | 11/1950 | Hauser | 260/448 |
| 2,531,812 | 11/1950 | Hauser | 252/8.5 |
| 3,325,340 | 6/1967 | Walker | 161/168 |
| 3,434,917 | 3/1969 | Kraus et al. | 162/3 |
| 3,791,969 | 2/1974 | Patil | 210/23 |
| 4,271,228 | 6/1981 | Foster | 428/281 |
| 4,608,303 | 8/1986 | Ballard et al. | 428/357 |

Primary Examiner—Mark L. Bell
Assistant Examiner—Anthony J. Green
Attorney, Agent, or Firm—Marion C. Staves

[57] ABSTRACT

It has been found that water stable articles, such as films and sheets, can be prepared from chemically delaminated vermiculite platelets if radical or ionically polymerizable organo-substituted onium salts are ionically bonded to the platelets and the resulting system cured.

18 Claims, No Drawings

AQUEOUS SUSPENSION OF DELAMINATED VERMICULITE

This application is a division of application Ser. No. 025,121, filed Mar. 12, 1987.

FIELD OF THE INVENTION

This invention relates to aqueous suspensions of chemically delaminated vermiculite and solid objects made therefrom.

BACKGROUND OF THE INVENTION

Vermiculite ore is comprised of individual magnesium aluminum silicate lamellae bonded together by divalent metal cations, mostly magnesium. Each lamella is a layer of magnesium aluminum silicate having a thickness of about 9.25 angstroms.

In the prior art, aqueous suspensions of discrete vermiculite platelets, each platelet several lamellae thick, have been made by several methods, as for example, by contacting vermiculite ore with an aqueous solution of at least one salt of sodium, lithium, or an organo-substituted ammonium cation, followed by aqueous washing, so that the ore swells to at least twice its original volume, and shearing the swollen ore into the discrete platelets. Such discrete platelets are commonly referred to as chemically delaminated vermiculite platelets. Films and coatings cast from such suspensions have good flame resistant properties, but poor stability in water.

Various methods for improving the water stability of vermiculite structures is taught in the prior art. These include the incorporation of organic polymers and copolymers; soaking the structure in solutions of divalent metal cations; incorporation of silicone polymer precursors; or contacting the finished structure with the vapor of certain amines or ammonia gas.

Unfortunately, the processes for improving the water stability of solid objects made from suspensions of vermiculite platelets have not been entirely satisfactory. Many of the aforementioned processes are not satisfactory because they involve tedious post treatments, or require the incorporation of large quantities of organic materials which degrade the high temperature properties of the structures.

SUMMARY OF THE INVENTION

According to the instant invention, a composition comprising an aqueous suspension of chemically delaminated vermiculite platelets is characterized in that the platelets are ionically bonded to radical or ionically polymerizable organo-substituted onium ions. Solid objects that are formed from this suspension can be made water-stable by curing the solid objects after they are made (i.e., polymerizing the onium ions that are bound to the platelets). The cured objects are believed to comprise a single phase system of vermiculite platelets that are ionically bonded to an organic, polymeric backbone.

DETAILED DESCRIPTION OF THE INVENTION

In general, the composition of this invention comprises from about 2 to about 150 milliequivalents of monomer, most preferably from about 10 to about 100 milliequivalents of monomer per 100 grams of vermiculite.

The organo-substituted onium ions that can be polymerized are ammonium, sulfonium or phosphonium ions that contain one or more polymerizable groups. Examples of such ions are crotyltriethylammonium, allylammonium, methacryloxyethyltrimethylammonium, 3-acryloxyneopentyltrimethylammonium, 2-methacryloxyethyl-t-butylammonium, diallylammonium, diallyldimethylammonium, allyldimethylsulfonium, methacrylamidopropyltrimethylammonium, acrylamidopropyltriethylammonium, butenyltrimethylammonium, vinylpyridinium ions such as N-methyl-2-vinylpyridinium, vinylbenzyldimethylsulfonium, vinylbenzyltrimethylammonium, 2,3-epoxypropyltrimethylammonium, triethylvinylphosphonium, tributylvinylphosphonium, α-ammonium-γ-butyrolactone, glycidyltrimethylammonium, 1-methyl-1-tert-butylaziridinium, and 1-ethyl-1,3,3-trimethyl azetidinium.

The anions of these onium ion salts are preferably inert anions commonly found in stable salts of these onium ions, for example, halide ions, and preferably chloride.

Preferably, the vermiculite platelets in the aqueous suspension of the instant invention have a maximum particle size of about 200 microns, more preferably have a maximum size of 50 microns. The vermiculite platelets have a preferable thickness of less than about 0.5 microns, more preferably less than about 0.05 microns, and a preferable aspect ratio (i.e., the ratio of the maximum dimension of length or breadth to thickness) of at least about 10, more preferably at least about 100.

Generally, the aqueous suspension of vermiculite platelets of the instant invention can be made using aqueous suspensions of chemically delaminated vermiculite platelets that are known and that are made by any known process for chemically delaminating vermiculite such as, for example, onium salt or lithium salt exfoliation as disclosed in U.S. Pat. Nos. 3,325,340, 3,434,917, and 4,608,303, the disclosures of which are incorporated herein by reference.

When known suspensions of chemically delaminated vermiculite platelets are used in accordance with the instant invention, the vermiculite platelets made from these known processes are then contacted with an aqueous salt solution of one or more of the organic, polymerizable cations useful in accordance with the instant invention to effectuate an exchange of the cationic species, e.g., lithium, that are ionically bonded to the known chemically delaminated vermiculite platelets for the organic, polymerizable cations. The concentration of the organic, polymerizable cation in the solution varies depending on the amount of vermiculite used and the amount of exchange desired. Preferably, an exchange for at least 10 milliequivalents of the cations is desired, so an excess amount, in moles, of the organic, polymerizable cations is needed, based on the total number of moles of cationic species bonded to the known chemically delaminated vermiculite platelets.

Preferably, the aqueous suspension of the instant invention is made by delaminating vermiculite ore using polymerizable ions. First, sodium or lithium intercalated vermiculite ore is immersed in an aqueous salt (i.e., water soluble salt, e.g., as recited above) solution of a radically or ionically polymerizable organo-substituted onium ion. This causes an exchange of the sodium or lithium ions for the polymerizable ions. Alternatively, vermiculite may be immersed directly into an aqueous salt solution of a poymerizable onium ion. The polymerizable ion-intercalated ore is then swollen with water to at least two times, preferably three to six times its original volume. The swollen ore is then sheared into an aqueous suspension of discrete platelets that are ionically bonded to the polymerizable ions.

Examples of the radially or ionically polymerizable, organo-substituted onium (i.e., ammonium phosphonium or sulfonium) ion that can be intercalated between the layers of vermiculite ore are crotyltriethylammonium, allylammonium, methacryloxyethyltrimethylammonium, 3-acryloxyneopentyltrimethylammonium, 2-methacryloxyethyl-t-butylammonium, diallylammonium, diallyldimethylammonium, allyldimethylsulfonium, methacrylamidopropyltrimethylammonium, acrylamidopropyltrimethylammonium, and butenyltrimethylammonium. Allylammonium and diallyldimethylammonium are preferred.

Sodium intercalated vermiculite is known, such as disclosed in the heretofore mentioned U.S. Pat. Nos. 3,325,340 and 3,434,917.

Generally, according to the preferred embodiment, an exchange of at least about 10 milliequivalents of the sodium ions is desirable, requiring use of an excess amount, in moles, of polymerizable organo-substituted onium ion, based on the total number of moles of sodium present in the vermiculite.

The exchange step of the preferred method can be carried out at room temperature (about 25° C.); however, it is preferable to carry it out at elevated temperatures up to about 105° C. More preferably, the exchange step is carried out under reflux temperature and conditions.

After the exchange step, the polymerizable ion-exchanged vermiculite is preferably washed with water to remove sodium ion and excess polymerizable ion. The exchanged vermiculite is then immersed in water and allowed to swell to at least two times, and preferably three to six times its original volume. This swelling insures adequate separation of the platelets for later shearing.

After swelling, the vermiculite is sheared by known methods for shearing chemically swollen vermiculite such as disclosed in the heretofore mentioned U.S. Pat. Nos. 3,325,340 and 3,434,917. Shearing is continued until at least about half of the resulting platelets are less than about 200, preferably less than about 50 microns. More preferably, platelets having a particle size greater than about 50 microns are then removed from the aqueous suspension of platelets by known filtering methods, such as disclosed in the heretofore mentioned U.S. Pat. No. 4,608,303.

The aqueous suspension of vermiculite platelets according to the instant invention can be formed into solid objects, such as films, by known methods for making solid objects from known vermiculite suspensions, e.g., by casting the suspension in a mold and allowing the water to evaporate, or by electrodeposition methods, such as disclosed in U.K. Patent Application GB No. 2 124 256A.

According to the instant invention, the vermiculite platelets comprising the solid formed objects are then polymerized by suitable polymerization techniques such as, for example, by electron beam irradiation of the solid objects, or by heating solid objects formed from aqueous suspensions of the instant invention that may or may not contain suitable, radical initiators or catalysts for ionic polymerization.

Electron beam initiated polymerization is performed using known electron beam generators delivering a sufficient radiation dose to the solid object. The amount of radiation required to cure the solid objects varies depending on the polymerizable ion bound to the platelets, and the thickness of the object and is determinable by those skilled in the art.

Heat initiated radical polymerization in accordance with this invention is carried out using temperature and times determinable by one skilled in the art. Generally, a temperature is selected so that the processing time is equivalent to from about 2 to about 5 half lives of the initiator. In the absence of an initiator, generally higher temperatures are required depending on the structure of the polymerizable group.

Useful, radical polymerization initiators and catalysts for ionic polymerization are those commonly used in the art. Typical examples are shown in G. Odian "Principles of Polymerization", pages 175–177 and pages 303–307, 1970, McGraw-Hill, Inc., New York, N.Y.

Optional useful additives in the aqueous suspensions used to make the solid objects of the instant invention are, for example, film forming polymeric binders, inorganic and organic fibers and fillers, adhesion promoters, and plasticizers.

In order to more fully explain the instant invention, the following Examples are included. However, the invention is not intended to be limited thereto. All parts and percentages in the Examples are by weight unless indicated otherwise. Physical properties of tensile strength, modulus, and elongation recorded in the Examples are determined according to ASTM D882.

EXAMPLE 1

An aqueous suspension of vermiculite platelets is made according to a preferred embodiment of the instant invention, i.e., exfoliating vermiculite by use of polymerizable ions. Two hundred grams of grade L-5 vermiculite (as graded per ASTM material designation C-156) is refluxed for sixteen hours in 1 liter of 2M NaCl solution (116.88 g NaCl/1 liter $H_2O$). The mixture is cooled, filtered and washed with large quantities of water. The sodium exchanged ore is then air dried. The dried ore is then refluxed for sixteen hours in aqueous 2M methacryloxyethyltrimethylammonium iodide (600 g, 2.0 moles per 1 liter water). The ore is cooled, filtered, and washed with water several times. Upon washing the ore swells approximately four-fold. The swollen ore is then sheared at high speed for 30 minutes in a waring blender. The sheared suspension is passed through a No. 325 mesh (45 micron) sieve to remove large particles. The sieved solution is then centrifuged, decanted, and the solids redispersed in a quantity of water sufficient to make a 2% weight solids suspension.

EXAMPLE 2

To illustrate making a film using the suspension of vermiculite platelets of the instant invention, the 2% dispersion made in Example 1 is poured into an aluminum frame (to a depth of ⅛"), which is mounted on a teflon sheet using a silicone adhesive. Slow evaporation of the water at ambient temperature results in a 4 mil thick film, which can be peeled from the teflon backing. The film is redispersible in water, has a tensile strength of 3,050 psi, modulus of $7.0 \times 10^5$ psi and elongation of 0.7%. Heating at 160° C. for two hours in an inert atmosphere ($N_2$) renders the film non-dispersible in water (infrared spectroscopy indicates a significant reduction in the intensity of the signal at 1622 cm$^{-1}$). The cured film has a tensile strength of 4,870 psi, a modulus of $16.0 \times 10^5$ psi, and an elongation of 0.3%. The film contains 7.04% by weight carbon (equivalent to 11.2% by weight monomer).

EXAMPLE 3

To show the preparation of a water non-dispersible organo-vermiculite film using diallyldimethylammonium as the organic, polymerizable cation, 120 g. of sodium exchanged vermiculite ore prepared as described in Example 1 is refluxed for sixteen hours in 2M aqueous diallyldimethylammonium chloride (600 mls). The ore is filtered from solution and washed several times with water. After several washings the ore swells to about twice its original volume. The swollen ore is then sheared (Tekmar Co. Super Dispax shearing device) for fifteen minutes. The resulting suspension is passed through a #325 mesh (45 micron) sieve, centrifuged, decanted, and the solids then redispersed in sufficient water to bring the suspension to 2% by weight solids. Films formed from this suspension (see Example 1 for procedure) have tensile strengths of 1,000 psi, moduli of $5.2 \times 10^5$ psi, elongation of 1.7% and are redispersible in water. They contain circa 1.6% by weight carbon (equivalent to 2.1% by weight diallyldimethylammonium ion). These films are then cured by exposure to electron beam radiation (20 Mrad) to make the film non-dispersible in water. As total dosage increases, the tensile strengths and moduli of the films increase smoothly from a 1,000 psi tensile strength and a $5.2 \times 10^5$ psi modulus for an untreated film to a 1,900 psi tensile strength and a $10.0 \times 10^5$ psi modulus after 20 Mrad of radiation have been administered. Film elongation values similarly are decreased from 1.7% (untreated) to 0.5% (20 Mrad dosage). Additional radiation above the 20 Mrad dose has little effect on the physical properties of the films.

EXAMPLE 4

A suspension and a film of the instant invention are made using vermiculite that has been exfoliated using known methods. Five hundred grams of grade L-5 vermiculite (as graded per ASTM material designation C-516) is refluxed in 175 ml of a saturated sodium chloride solution for sixteen hours. The ore is then filtered, washed with water and air dried. The sodium exchanged ore is then refluxed in 2 liters of an aqueous 2M solution of n-butylammonium chloride for six hours. The ore is filtered and washed with large quantities of water. After the ore is allowed to swell in water, it is dried overnight at 110° C.

The n-butylammonium exchanged ore is dispersed in water and sheared using a Tekmar SD45 disperser. The suspension is then passed through a 50-micron sieve. The sieved material is centrifuged and the water is decanted. The centrifuge cake is then stirred for three days at ambient temperature in an aqueous, 2M solution of methacryloxyethyltrimethylammonium iodide (the ammonium salt is prepared by reacting methacryloxyethyl-dimethylamine and methyl iodide in ether).

After the exchange, the suspension is centrifuged and the aqueous layer decanted. The solids are washed with water and centrifuged. The resulting ore slurry is dispersed in water to 2 wt% of suspension. Films are cast on teflon as in Example 1 and, after evaporation of the water, cured for two hours by heating at 160° C. to make a water-non-dispersible film. Films cast from the untreated n-butylammonium ore are water-dispersible.

EXAMPLE 5

A suspension and film are made according to the instant invention. A 20 wt % suspension of grade L-5 vermiculite is refluxed in a saturated sodium chloride solution for four hours, cooled to room temperature, filtered, washed with distilled water (by decantation), and air dried to a damp solid. A 20 wt % suspension of the Na exchanged ore is refluxed in a 2M aqueous solution of allyldimethylsulfonium chloride for four hours, cooled to room temperature, filtered, washed four times with distilled water (by decantation), and air dried. Twenty grams, dry weight, of the sulfonium exchanged ore is dispersed in 200 ml. distilled water, allowed to swell to six times its volume, and then it is sheared using a Tekmar SD45 disperser for two hours. The shearing vessel is cooled in an ice-water bath to maintain the temperature below 35° C. The suspension is centrifuged (2000 rpm, 1 minute) to remove particles larger than approximately 20 microns, and the supernatant suspension is decanted from the solids. The decanted suspension is diluted to two weight percent solid and poured into an aluminum frame (to a depth of ⅛"), which is mounted on an aluminum sheet using a silicone adhesive. Slow evaporation of the water at ambient temperature results in a three mil thick film which can be peeled from the aluminum backing. The film is redispersible in water. A portion of the film is exposed to electron beam radiation (15 Mrads/side), which makes the film non-dispersible in water.

EXAMPLE 6

Example 5 is repeated substituting allylammonium chloride for the allyldimethylsulfonium chloride. The resulting film has a tensile strength of 4400 psi, a modulus of 1100 Kpsi, and an elongation of 0.8%. The film is redispersible in water. A portion of the film is exposed to electron beam radiation (15 Mrads/side), which makes the film non-dispersible in water. The radiated film has a tensile strength of 9470 psi, a modulus of 900 Kpsi, and an elongation of 1.0%.

EXAMPLE 7

Example 4 is repeated substituting Dow Quat 188 ® for the methacryloxyethyl-trimethylammonium iodide and curing at 90° C. instead of 160° C. Dow Quat 188 has the following structure:

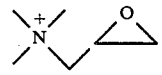

The resulting film is water-non-dispersible. Films cast from the untreated n-butylammonium ore are water-dispersible.

What is claimed is:

1. In a polymerizable composition comprising vermiculite platelets that have been deposited from an aqueous suspension, wherein the improvement comprises the platelets being ionically bonded to radical or ionically polymerizable organo-substituted onium ions.

2. A water stable, solid article prepared from chemically delaminated vermiculite platelets by radically or ionically polymerizing organo-substituted onium ions which have been ionically bonded to the said platelets.

3. The water soluble, solid article of claim 2, wherein the organo-substituted onium ions were polymerized by exposure to electron beam radiation in an amount sufficient to affect polymerization.

4. The water stable, solid article of claim 2, wherein the organo-substituted onium ions were polymerized by heat initiated radical polymerization.

5. The water stable, solid article of claim 2, wherein the organo-substituted onium ions were polymerized by an ionic process.

6. In a process for making an aqueous suspension of vermiculite platelets comprising the steps of:
(1) contacting vermiculite ore with an aqueous salt solution of an onium ion so as to intercalate the ion between the silicate layers in the vermiculite ore;
(2) immersing the onium ion-intercalated ore in water and allowing the ore to swell to at least twice its volume;
(3) shearing the swollen ore into an aqueous suspension of vermiculite platelets having a maximum particle size of 200 microns;
the improvement wherein the onium ion is an organo-substituted onium ion that can be polymerized by radical or ionic means.

7. The process of claim 6 wherein platelets larger than 50 microns are eliminated from the suspension.

8. The process of claim 6 wherein the vermiculite ore in step 1 is a sodium or lithium intercalated vermiculite ore.

9. The process of claim 6, wherein the organo-substituted onium ion is selected from crotyltriethylammonium, allylammonium, methacryloxyethyltrimethylammonium, 3-acryloxyneopentyltrimethylammonium, 2-methacryloxy-ethyl-t-butylammonium, diallylammonium, diallyldimethylammonium, allyldimethylsulfonium, methacrylamidopropyltrimethylammonium, acrylamidopropyltrimethylammonium, butenyltrimethylammonium, and mixtures thereof.

10. The process of claim 9, wherein the organo-substituted onium ion is an allylammonium ion.

11. The process of claim 9, wherein the organo-substituted onium ion is diallyldimethylammonium.

12. The product made by the process of claim 6.

13. In a process for making an aqueous suspension of vermiculite platelets comprising contacting chemically delaminated vermiculite platelets with an aqueous salt solution of an onium ion so as to exchange the cation used to effectuate delamination for the onium ion;
the improvement wherein the onium ion is an organo-substituted onium ion that can be polymerized by radical or ionic means.

14. The process of claim 13 wherein platelets larger than 50 mircrons are eliminated from the suspension.

15. The process of claim 13, wherein the organo-substituted onium ion is selected from crotyltriethylammonium, allylammonium, methacryloxyethyltrimethylammonium, 3-acryloxyneopentyltrimethylammonium, 2-methacryloxy-ethyl-t-butylammonium, diallylammonium, diallyldimethylammonium, allyldimethylsulfonium, methacrylamidopropyltrimethylammonium, acrylamidopropyltrimethylammonium, butenyltrimethylammonium, vinylpyridinium ions and substituted vinylpyridinium, vinylbenzyldimethylsulfonium, vinylbenzyltrimethylammonium, 2,3-epoxypropyltrimethylammonium, triethylvinylphosphonium, tributylvinylphosphonium ions, α-ammonium-γ-butyrolactone, glycidyltrimethylammonium, 1-methyl-1-tert butylaziridinium, 1-ethyl-1,3,3-trimethyl azetidinium, and mixtures thereof.

16. The process of claim 13, wherein the organo-substituted onium ion is an allylammonium ion.

17. The process of claim 13, wherein the organo-substituted onium ion is diallyldimethylammonium.

18. The product made by the process of claim 13.

* * * * *

UNITED STATES PATENT AND TRADEMARK OFFICE
CERTIFICATE OF CORRECTION

PATENT NO. :  4,877,551

DATED : October 31, 1989

INVENTOR(S) : LUKACS CASE 2-6

It is certified that error appears in the above-identified patent and that said Letters Patent is hereby corrected as shown below:

Column 2, Line 10,

" acrylamidopropyltriethylammonium "

should read

-- acrylamidopropyltrimethylammonium --

Column 3, Line 6, " radially "

should read -- radically --

Column 5, Line 63, " suspensionis "

should read -- suspension is --

UNITED STATES PATENT AND TRADEMARK OFFICE
CERTIFICATE OF CORRECTION

PATENT NO. : 4,877,551

DATED : October 31, 1989

INVENTOR(S) : LUKACS

It is certified that error appears in the above-identified patent and that said Letters Patent is hereby corrected as shown below:

Column 7, Claim 3, Line 3, " soluble "

should read -- stable --

Signed and Sealed this

Thirteenth Day of November, 1990

Attest:

HARRY F. MANBECK, JR.

*Attesting Officer*  *Commissioner of Patents and Trademarks*